(12) United States Patent
Hwang

(10) Patent No.: US 7,663,836 B2
(45) Date of Patent: Feb. 16, 2010

(54) DISK DRIVE BASE/COVER PLATE WITH PUSH PIN HOLE HAVING ENLARGED PORTION

(75) Inventor: Ji-ho Hwang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 568 days.

(21) Appl. No.: 11/182,827

(22) Filed: Jul. 18, 2005

(65) Prior Publication Data

US 2006/0103974 A1   May 18, 2006

(30) Foreign Application Priority Data

Nov. 17, 2004   (KR) .................... 10-2004-0094210

(51) Int. Cl.
*G11B 5/55* (2006.01)
(52) U.S. Cl. .................................. 360/97.01
(58) Field of Classification Search .............. 360/97.01, 360/97.02, 97.03, 98.01
See application file for complete search history.

(56) References Cited

U.S. PATENT DOCUMENTS 4,783,705 A * 11/1988 Moon et al. .............. 360/97.03
5,754,365 A * 5/1998 Beck et al. ................ 360/97.02
6,052,255 A * 4/2000 Kawabe et al. ........... 360/97.02
6,128,159 A * 10/2000 Ino ........................ 360/97.02
6,643,914 B1 * 11/2003 Xu ........................... 360/97.02
6,980,391 B1 * 12/2005 Haro ........................ 360/97.01
2005/0146848 A1 * 7/2005 Sheu et al. ............... 29/603.03

FOREIGN PATENT DOCUMENTS

| JP | 3-116481 | 5/1991 |
| JP | 7-182811 | 7/1995 |
| JP | 7-220422 | 8/1995 |
| JP | 7-230678 | 8/1995 |

* cited by examiner

*Primary Examiner*—Craig A. Renner
(74) *Attorney, Agent, or Firm*—Staas & Halsey LLP

(57) ABSTRACT

A base plate and a cover plate for a hard disk drive. At least one of the base plate and the cover plate is formed with a push pin hole extended in a slot shape in a predetermined length through which a push pin passes to implement a servo track write. The push pin hole is provided with an enlarged portion to prevent collision of the push pin, when the push pin enters into the push pin hole.

4 Claims, 6 Drawing Sheets

DISK DRIVE BASE/COVER PLATE WITH PUSH PIN HOLE HAVING ENLARGED PORTION

CROSS-REFERENCE TO RELATED APPLICATIONS

This application claims the priority of Korean Patent Application No. 10-2004-0094210, filed Nov. 17, 2004, in the Korean Intellectual Property Office, the disclosure of which is incorporated herein by reference.

BACKGROUND OF THE INVENTION

1. Field of the Invention

The present invention relates to a hard disk drive, and more particularly, to formation of a push pin hole to implement a process of servo track writing.

2. Description of the Related Art

In information storage for a computer, a hard disk drive (HDD) reads data from a disk or writes data on the disk by use of a magnetic head. In order to write or read the data, a servo signal is previously recorded in a surface of the disk, which is referred to as a servo track write (STW).

In order to implement the servo track write, the hard disk drive is loaded onto an STW apparatus, and a head stack assembly (HSA) is pushed by a push pin provided to the STW apparatus, according to a predetermined program, so that the magnetic head records the servo signal on the surface of the disk. Accordingly, a base plate or cover plate of the hard disk drive is formed with a push pin hole through which the push pin passes.

FIGS. 1 and 2 are perspective views depicting a conventional base plate and cover plate mounted to an STW apparatus, respectively. A hard disk drive including a disk and an HSA should be mounted to the STW apparatus to implement a servo track write, while only the base plate and the cover plate are respectively shown in FIGS. 1 and 2 for clarity.

In order to mount the hard disk drive onto the STW apparatus 1, as shown in FIG. 1, the hard disk drive is firstly laid on a support 2, with a base plate 10 of the hard disk drive being in contact with the support 2. Alternatively, the hard disk drive is laid on the support 2, as shown in FIG. 2, with a cover plate 20 of the hard disk drive being in contact with the support 2. At that time, a push pin 8 is inserted into the hard disk drive through push pin holes 18 and 25 of the base plate 10 or cover plate 20.

Next, an x-direction push arm 6 and a y-direction push arm 7 are pushed toward an x-direction reference pin 4 and a y-direction reference pin 5, respectively, so that the base plate 10 or the cover plate 20 is positioned on a reference position. After the hard disk drive is mounted onto the STW apparatus 1, the push pin 8 is slowly moved in a longitudinal direction of the push pin hole 18 to push the HSA, so that a magnetic head records the servo signal on the surface of the disk. FIG. 1 further includes a z-direction.

Because of dimensional tolerance of the base plate 10 or cover plate 20, or operational error of a human or a robot implementing the mounting process, when the base plate 10 or the cover plate 20 is laid on the support 2, the push pin 8 does not penetrate through the push pin hole 18 or 25, and collides against a periphery of the hole, which damages the push pin 8 and deteriorates a quality of servo track write. In order to solve the above problem, the push pin hole 18 or 25 may be sufficiently enlarged, which deteriorates a sealing property of the hard disk drive and weakens rigidity of the base plate 10 or cover plate 20.

BRIEF SUMMARY

An aspect of the present invention provides a base plate or cover plate for a hard disk drive, in which a shape of a push pin hole is improved.

According to one aspect of the present invention, there is provided a base plate for a hard disk drive, the base plate formed with a push pin hole extended in a slot shape in a predetermined length through which a push pin passes to implement a servo track write, wherein the push pin hole is provided with an enlarged portion to prevent collision of the push pin, when the push pin enters into the push pin hole.

According another aspect of the present invention, there is provided a cover plate for a hard disk drive, the cover plate formed with a push pin hole extended in a slot shape in a predetermined length through which a push pin passes to implement a servo track write, wherein the push pin hole is provided with an enlarged portion to prevent collision of the push pin, when the push pin enters into the push pin hole.

According to still another aspect of the present invention, there is provided a hard disk drive including a housing having a base plate and a cover plate to be coupled to the base plate, a disk rotatably mounted on the base plate, and a head stack assembly pivotally installed to the base plate and having a magnetic head supported at a front end thereof for writing a data on the disk or reading the data from the disk, wherein at least one of the base plate and the cover plate is formed with a push pin hole extended in a slot shape in a predetermined length through which a push pin passes to implement a servo track write, wherein the push pin hole is provided with an enlarged portion to prevent collision of the push pin, when the push pin enters into the push pin hole.

The enlarged portion may be provided at a longitudinal center portion of the push pin hole.

The enlarged portion may be formed by inwardly concavely bending at least one of a pair of inner sides at a longitudinal center portion of the push pin hole. A border of the push pin hole may be formed in a gentle closed curve According to another aspect of the present invention, there is provided a plate including a slot shaped push pin hole extending around a mounting boss on the plate to which a head stack assembly is mounted, the push pin hole having at a substantial center an enlarged portion with a width greater than a width of other portions of the push pin hole, the enlarged portion extending toward the mounting boss.

According to another aspect of the present invention, there is provided a plate including a push pin hole in the shape of a slot extending along a moving arc of a push pin of a servo track writer, the push pin hole having at a substantial center an enlarged portion with a width greater than a width of other portions of the push pin hole, at least a portion of the enlarged portion extending away inwardly from the arc.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Figure 1:
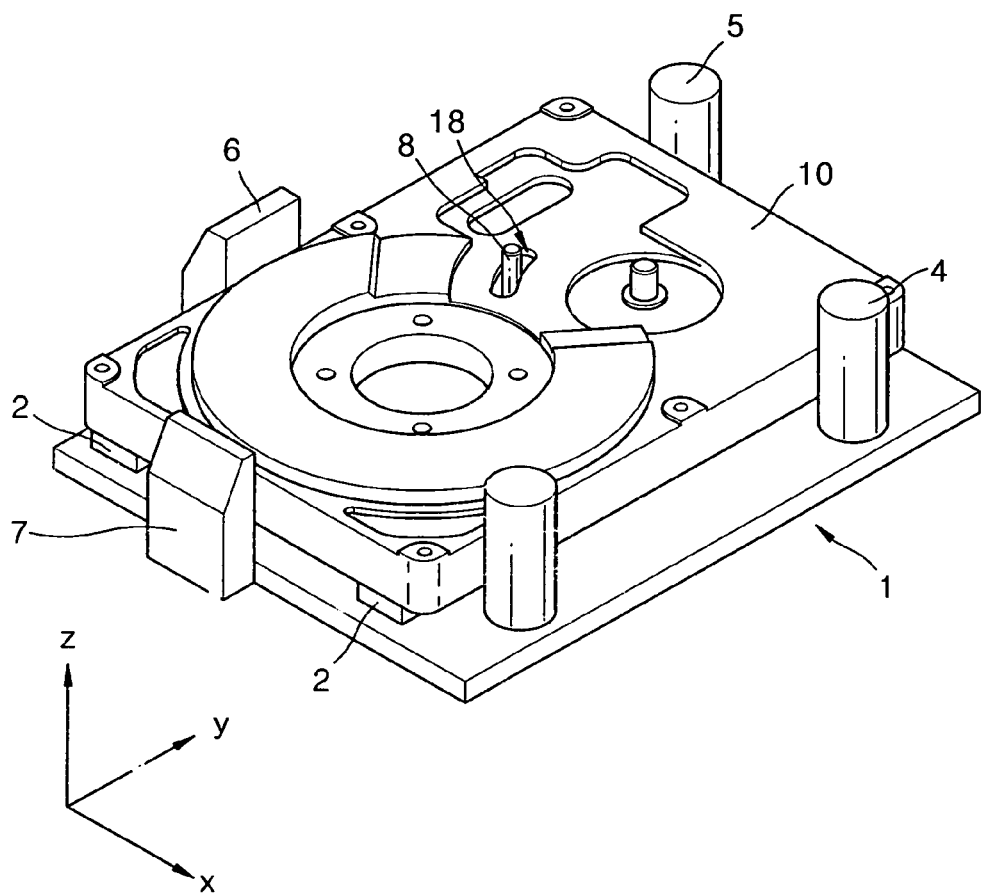
FIGS. 1 and 2 are perspective views respectively depicting a conventional base plate and a conventional cover plate mounted to a servo track write (STW) apparatus.
Figure 2:
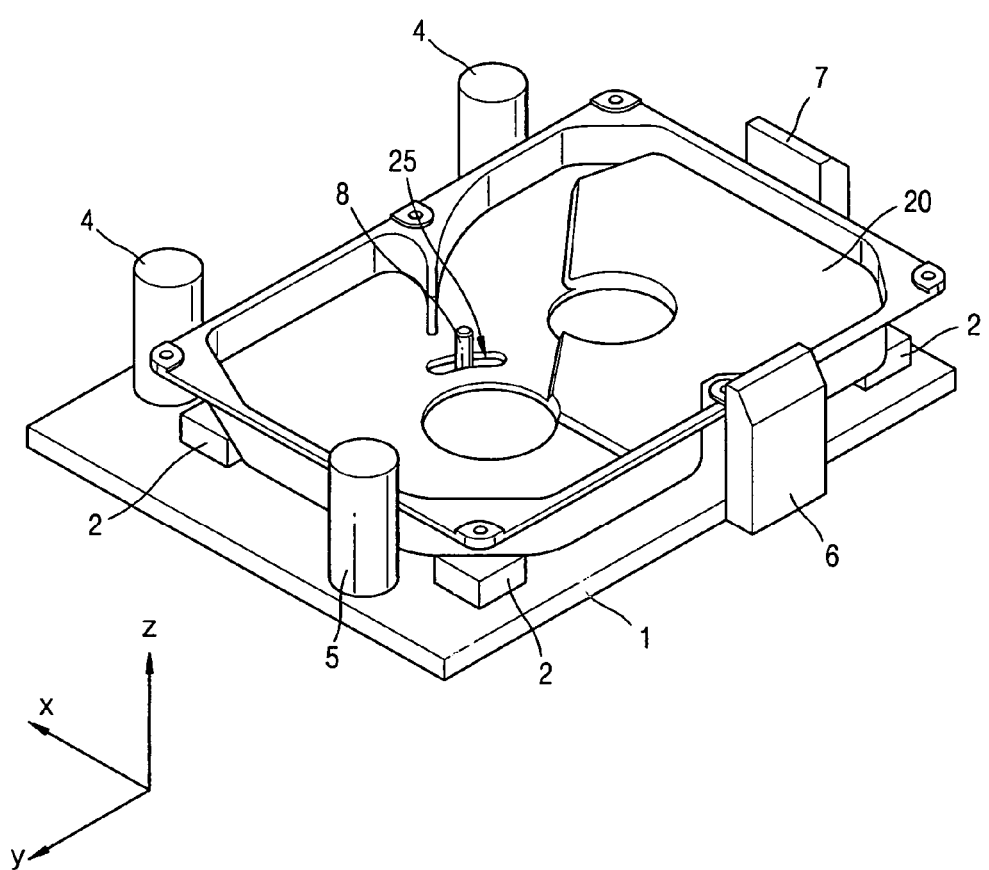

Reference will now be made in detail to an embodiment of the present invention, examples of which are illustrated in the accompanying drawings, wherein like reference numerals refer to the like elements throughout. The embodiment is described below in order to explain the present invention by referring to the figures.

Figure 3:
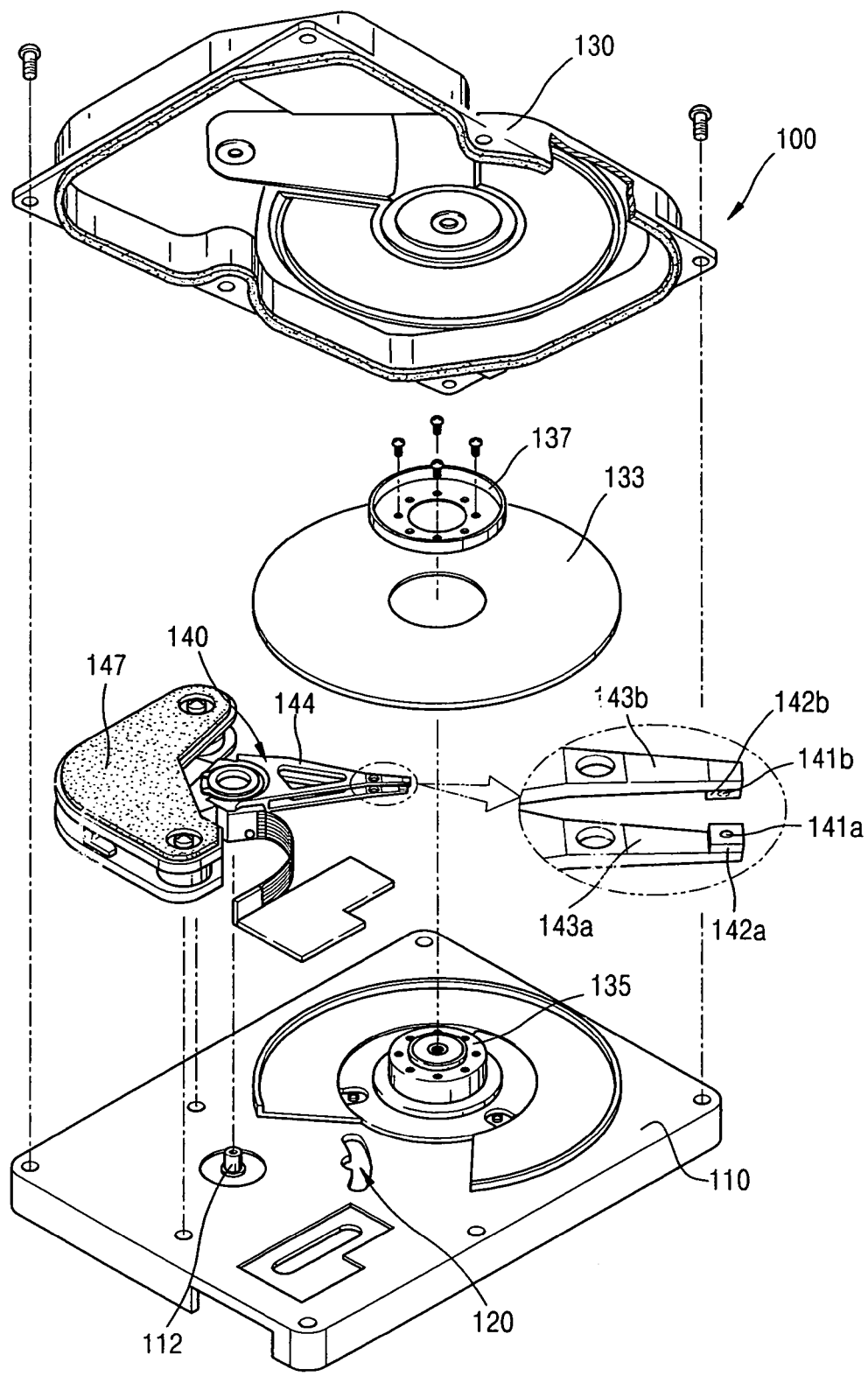
FIG. 3 is an exploded view of a hard disk drive according to an embodiment of the present invention.

FIG. 3 is an exploded view of a hard disk drive 100 according to an embodiment of the present invention.

Referring to FIG. 3, the hard disk drive 100 of the present embodiment includes a housing formed by coupling a base plate 110 and a cover plate 130, with a space being formed in the housing. Also, the hard disk drive 100 includes a disk 133, a spindle motor 135, and a head stack assembly 140 in the housing.

The housing includes the base plate 110 supporting the spindle motor 120 and the head stack assembly 140, and the cover plate 130 coupled to an upper portion of the base plate 110 for protecting the disk 133. The housing is generally made of stainless steel or aluminum. The base plate 110 is formed with a push pin hole 120 through which a push pin (shown in FIGS. 4 and 5 and denoted as 8) passes to implement servo track write (STW).

The disk 133 is installed on the base plate 110. A conventional hard disk drive includes at least four disks so as to increase storage capacity of data. Recently, since a surface recording density is abruptly increased, only one or two disk can store a sufficient amount of data. Hard disk drives having one or two disks are widely used today.

The spindle motor 135 is adapted to turn the disk 133, and is secured to a mounting hole (shown in FIGS. 4 and 5 and denoted as 114) of the base plate 110. A disk clamp 137 is connected to an upper end of the spindle motor 135 to prevent separation of the disk 133.

The head stack assembly 140 is adapted to write the data on the disk 133 or read the data from the disk, and is pivotally mounted to a mounting boss 112 of the base plate 110. The head stack assembly 140 includes an arm 144 inserted into the mounting boss 112, respective first and second suspensions 143a and 143b coupled to a front end of the arm 144, and respective first and second sliders 142a and 142b each respectively supported by the suspensions 143a and 143b. Respective first and second magnetic heads 141a and 141b are mounted to the sliders 142a and 142b, respectively, to write and read the data.

A voice coil motor 147 is provided for supplying a rotational force to operate the arm 144. The voice coil motor 147 is controlled by a servo control system, and rotates the arm 144 in a direction according to Fleming's left-hand rule by interaction of an electric current inputted to of a voice coil motor coil and magnetic field formed by magnets. The sliders 142a and 142b attached to the front end of the suspensions 143a and 143b are moved in a direction toward the spindle motor 135 on the disk 133 or in a direction toward an outer periphery of the disk 133.

When a power of the hard disk drive 100 is turned on and the disk 133 starts to turn, a lift force is generated on the disk 133 by the turning disk. The sliders 142a and 142b are floated at a height at which the lift force generated by the rotation of the disk 133 has paralleled a resilient force generated by the suspensions 143a and 143b on a surface of the disk 133. Accordingly, the magnetic heads 141a and 141b mounted on the sliders 142a and 142b write the data on the disk 133 or read the data from the disk 133, with the magnetic heads 141a, 141 b being spaced apart from the turning disk 133 at a certain interval.

Figure 4:
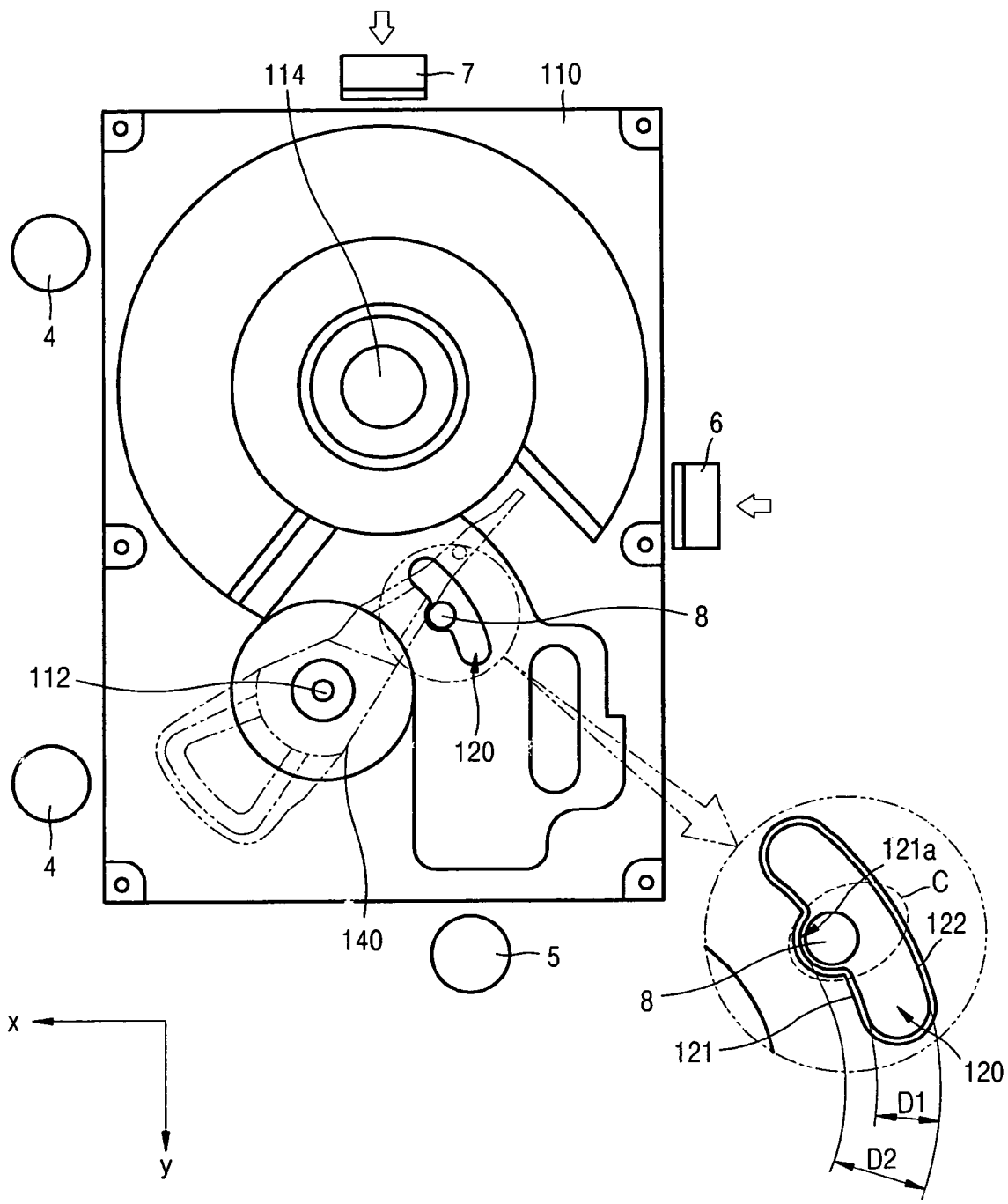
FIGS. 4 and 5 are plan views illustrating the hard disk drive of FIG. 3 during a process of mounting a base plate according to an embodiment of the present invention onto an STW apparatus.
Figure 5:
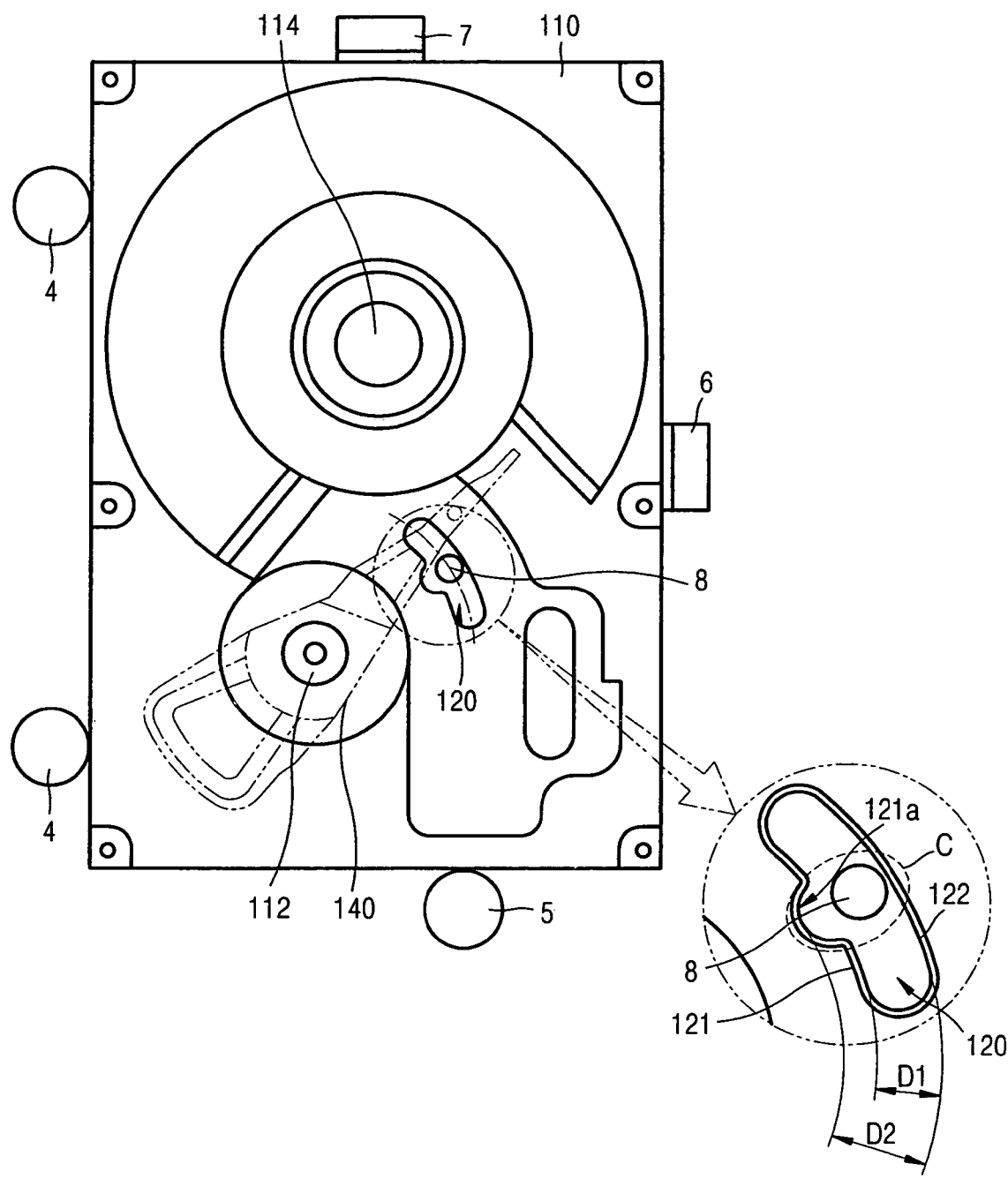

Referring to FIGS. 4 and 5, the push pin hole 120 of the base plate 110 has a shape corresponding to a slot extended in a predetermined length along a moving trace of the push pin 8 of the STW apparatus. The push pin 8 moves along an arc trace around the mounting boss 112 of the base plate 110 in the process of implementing servo track write, so as to push the head stack assembly 140 pivotally. Accordingly, the push pin hole 120 becomes a slot extended along an arc trace around the mounting boss 112 corresponding to the moving trace of the push pin 8.

The push pin hole 120 is provided with an enlarged portion having a width D2 wider than a width D1 of other portion at a center portion C of the push pin hole. The enlarged portion is adapted to prevent the push pin 8 from colliding against the base plate 110, when the hard disk drive 100 is mounted onto the STW apparatus. The enlarged portion has a pair of inner sides 121 and 122 defining a longitudinal border of the push pin hole 120, of which one inner side 121 more adjacent to the mounting boss 112 than the other inner side 122 is inwardly concavely bent to form an enlarged and curved portion 121a. In order to prevent rigidity of the base plate 110 from being weakened due to stress concentration, the enlarged and curved portion 121a of the inner side 121 is formed in a smooth curve, and the border of the push pin hole 120 is also formed in a smooth closed curve.

In order to implement the servo track write for writing a servo signal on the disk 133, when the hard disk drive 100 is laid on the STW apparatus, with the base plate 110 of the hard disk drive facing the STW apparatus, the push pin 8 is inserted into the housing of the hard disk drive 100 through the enlarged portion of the push pin hole 120, as shown in FIG. 4. The push pin 8 is adjacent to the one inner side 121. Since the inner side 121 is provided with the enlarged and curved portion 121a, the push pin 8 does not collide against the base plate 110 to prevent damage thereof.

Next, the x-direction push arm 6 and the y-direction push arm 7 are pressed toward the x-direction reference pin 4 and the y-direction reference pin 5, as shown by arrows in FIG. 4. As such, the base plate 110 is adjusted to a reference position to start implementing the servo track write, and the push pin 8 is away from the bent portion 121a and, simultaneously, is close to the inner side 122, as shown in FIG. 5. After the hard disk drive 100 is mounted on the STW apparatus as described above, the push pin 8 is slowly moved in a longitudinal direction of the push pin hole 120. The head stack assembly 140 is slowly moved on the turning disk 133 (shown in FIG. 3), and the magnetic heads 141a and 141b write the servo signal on the surface of the disk 133.

Figure 6:
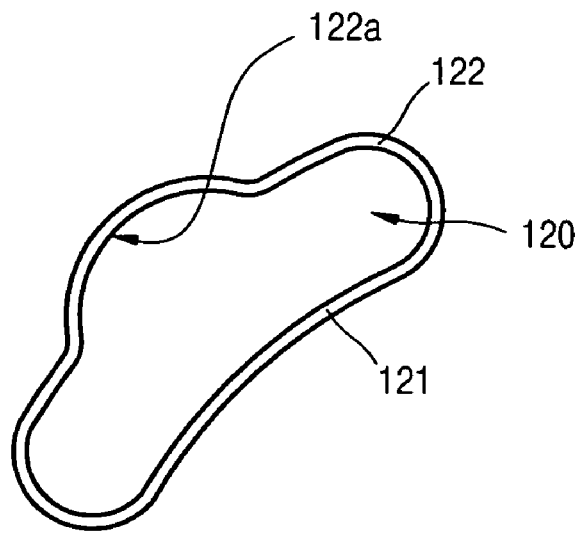
FIGS. 6 and 7 are plan views illustrating alternative examples of a push pin hole formed at a base plate of the hard disk drive according to an embodiment of the present invention.
Figure 7:
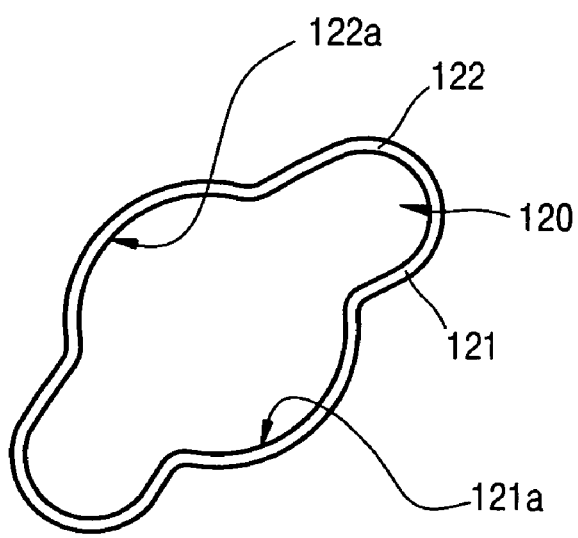

The bent portion forming the enlarged portion of the push pin hole 120 may be altered according to a type of the STW apparatus or a method of adjusting a reference position. For example, as shown in FIG. 6, an enlarged portion of the push pin hole 120 may be formed by concavely bending one inner side 122 of a pair of inner sides 121 and 122 into a curved portion 122a which define a longitudinal border of the push pin hole 120. Alternatively, as shown in FIG. 7, an enlarged portion of the push pin hole 120 may be formed by bending a pair of inner sides 121 and 122 which define a longitudinal border of the push pin hole 120 into a curved portion 121a of the inner side 121 and a curved portion 122a of the inner side 122.

Although FIGS. 3 through 7 show the push pin holes formed at the base plate to illustrate an embodiment of the present invention, it is to be understood that an embodiment of the present invention includes a push pin hole formed at a cover plate.

The base plate or cover plate for the hard disk drive according to the above-described embodiment of the present invention has the following effects.

Since the push pin hole is provided with the enlarged portion, it can prevent damage of the push pin when the hard disk drive is laid on the STW apparatus. As such, it can improve a quality of the servo track write.

In addition, although the entire of the push pin hole is not enlarged, it can prevent damage of the push pin, so that it can suppress deterioration of sealing property and rigidity of the base plate or cover plate. Also, according to an embodiment of the present invention, since the border of the push pin hole defines a closed cover, it can suppress the deterioration of rigidity of the base plate or cover plate due to stress concentration.

Although an embodiment of the present invention have been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A hard disk drive including a housing having a base plate and a cover plate coupled to the base plate, a disk rotatably mounted on the base plate, and a head stack assembly pivotally installed to the base plate and having a magnetic head supported at a front end thereof for writing data on the disk or reading the data from the disk, comprising:

a push pin hole formed in at least one of the base plate and the cover plate and extending in a slot shape in a predetermined length through which a push pin passes to implement a servo track write, the push pin hole including end portions and an enlarged central portion to prevent collision of the push pin when the push pin enters into the push pin hole, each of the end portions having a substantially constant width and the enlarged central portion having a width increasing from the end portions.

2. The hard disk drive of claim 1, wherein the enlarged portion is provided at a longitudinal center portion of the push pin hole.

3. The hard disk drive of claim 1, wherein the enlarged portion is inwardly concavely bent at least one of a pair of inner sides at a longitudinal center portion of the push pin hole.

4. The hard disk drive of claim 1, wherein a border of the push pin hole is a gentle closed curve.

* * * * *